E. P. CULVER.
HEAT CONTROLLING SYSTEM.
APPLICATION FILED JAN. 17, 1913.
1,063,780.
Patented June 3, 1913.
2 SHEETS—SHEET 1.
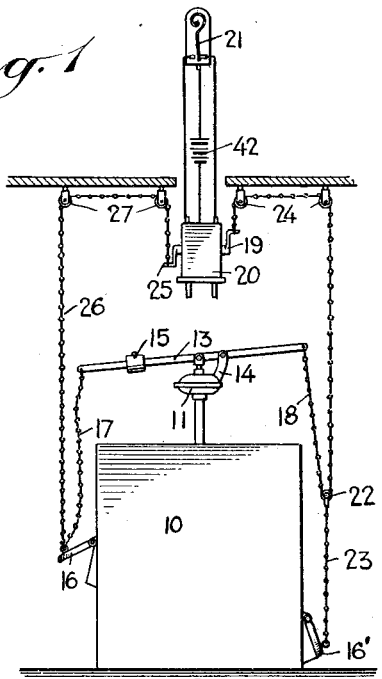
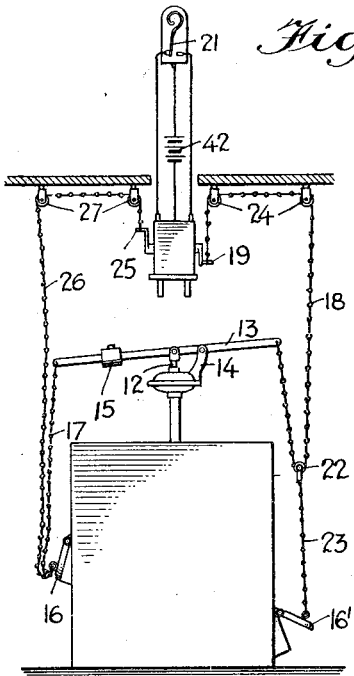
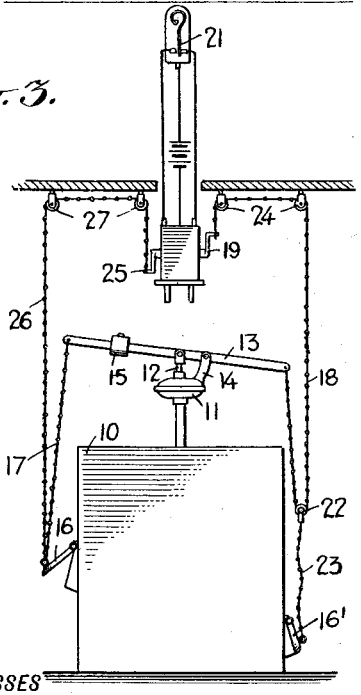
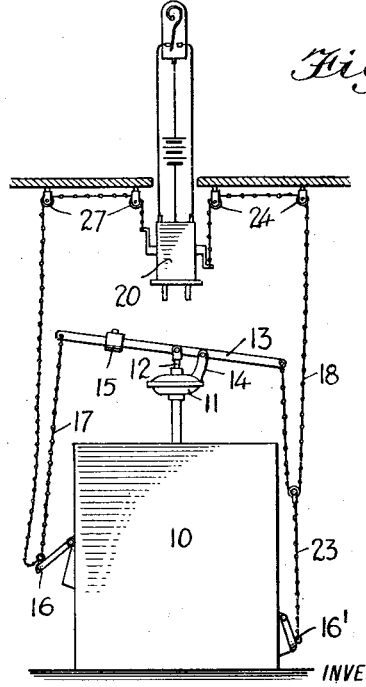
WITNESSES
Geo. N. Naylor
B. Joffe
INVENTOR
Edward P. Culver
BY Munn & Co
ATTORNEYS

E. P. CULVER.
HEAT CONTROLLING SYSTEM.
APPLICATION FILED JAN. 17, 1913.

1,063,780.

Patented June 3, 1913.
2 SHEETS—SHEET 2.

WITNESSES
Geo. N. Naylor
B. Joffe

INVENTOR
Edward P. Culver
BY Munn & Co
ATTORNEYS

UNITED STATES PATENT OFFICE.

EDWARD P. CULVER, OF SCHENECTADY, NEW YORK.

HEAT-CONTROLLING SYSTEM.

1,063,780. Specification of Letters Patent. Patented June 3, 1913.

Application filed January 17, 1913. Serial No. 742,612.

*To all whom it may concern:*

Be it known that I, EDWARD P. CULVER, a citizen of the United States, and a resident of Schenectady, in the county of Schenectady and State of New York, have invented a new and Improved Heat-Controlling System, of which the following is a full, clear, and exact description.

The object of my invention is to provide a heat controlling system in which a thermostat control is so interconnected with a diaphragm control that although the thermostat control shall operate to maintain the living-room temperature at the predetermined value, the diaphragm control will under any and all conditions prevent the thermostat control from causing to be generated within the heating boiler a pressure of steam exceeding a predetermined maximum.

The invention consists of the construction and combination of parts to be more fully described hereinafter and fully set forth in the claims.

Figure 5:
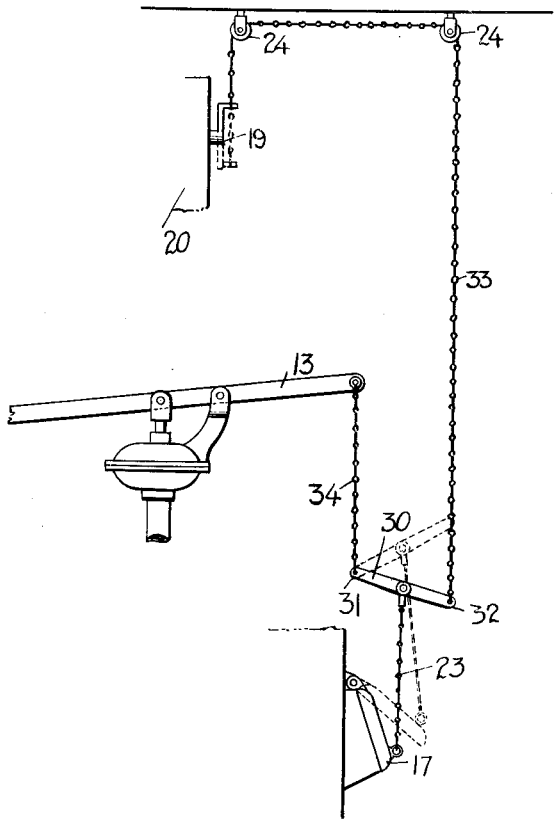
Figure 6:
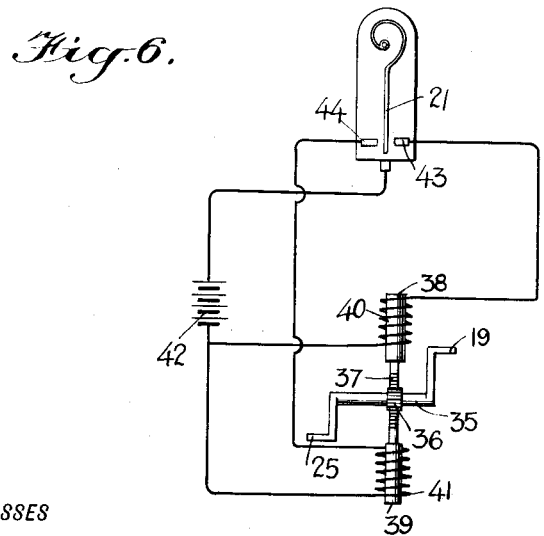

Reference is to be had to the accompanying drawings forming a part of this specification, in which like characters indicate corresponding parts in all the views and in which:

Figure 1 is a side elevation of a boiler provided with an embodiment of my invention, showing the thermostat operating the cooling damper while the diaphragm on the boiler is below the maximum expansion; Fig. 2 is a similar elevation showing the thermostat operating the draft damper with the diaphragm still in the same position as in Fig. 1; Fig. 3 is also a side elevation showing the thermostat and the diaphragm both acting independently of each other on the cooling damper; Fig. 4 is a similar side elevation showing the cooling damper controlled by the diaphragm alone; Fig. 5 is a modified form of connection between the diaphragm and the thermostat mechanism; and Fig. 6 is a diagrammatic view of the mechanism operated by the thermostat.

Referring to the drawings, 10 represents a boiler provided with a diaphragm casing 11, the expansion and contraction of which under the pressure of the steam in the boiler controls the dampers of the boiler. A stem 12 is connected to the diaphragm in the casing 11 and is moved by the expansion or contraction of the diaphragm under the steam pressure. Pivotally connected to the bracket 14 is a lever 13 which is operated by the diaphragm 11 through the medium of the stem 12. The diaphragm in the casing 11 prevents the rise of steam pressure to such a point that the safety valve will blow. It controls through the medium of the stem and its lever 13 the draft and cooling dampers, thereby checking the fire and preventing the generating of excessive steam pressure. The lever 13 has its fulcrum and a bracket 14 attached to the frame of the diaphragm casing 11 so that one side of the lever 13 is, under the action of the diaphragm in the casing 11, a lever of the third class, and on the other side is a lever of the first class. The end forming the third-class lever is provided with an adjustable weight 15 for balancing the action of the diaphragm.

The boiler 10 has a cooling damper 16 and a draft damper 16'. A chain 17 connects one end of the lever 13 to the cooling damper, while the other end of the lever is connected by means of a chain 18 to the crank 19 of the mechanism 20 controlled by the thermostat 21 positioned in a desired place in the house being heated with this boiler. The chain 18 is provided with a pulley 22 riding on this chain 18 and connected by means of a chain 23 to the draft damper 16'. The chain 18 is also provided with a series of directing pulleys 24, so as to properly direct the chain 18 when the crank 19 is operated by the thermostat. The mechanism 20 has another crank 25 at the side opposite the crank 19 and oppositely directed and also connected by means of a chain 26 passing through a series of directing pulleys 27 to the cooling damper 16.

When the temperature in the place where the thermostat is positioned has risen above the normal for the thermostat, the same will be thrown into the position shown in Fig. 1. This will operate the cooling damper and thereby reduce the temperature in the furnace and, consequently, in the place where the thermostat is found.

Fig. 2 represents a condition when the temperature in the place where the thermostat is found has fallen below the normal and, consequently, the thermostat is thrown in the opposite direction, as shown in Fig. 2, thereby opening the draft damper and consequently causing the boiler to generate steam more rapidly. In both Figs. 1 and 2 the steam pressure in the boiler had not attained that predetermined value necessary to expand the diaphragm against the force of the adjustable weight 15.

Fig. 3 shows a condition where the thermostat is in a condition similar to Fig. 1, while the boiler pressure has risen to the maximum, and, therefore, both the thermostat and the diaphragm 11 are independently opening the cooling damper 16.

Fig. 4 indicates a condition when the boiler pressure is at its maximum, thereby forcing the lever 13 to operate the cooling damper 16 while the temperature in the place provided with the thermostat is below the normal; consequently the thermostat tends to open the draft damper 16'; but this is prevented by the position of the lever 13, as the chains 18 and 23 are so formed that when the thermostat and lever are in the position shown in Fig. 4, the draft damper 16' cannot be operated by the thermostat, the length of the chains 18 and 23 being such as not to permit its operation.

The condition of Fig. 4 illustrates an important step. In fact, the operation now to be explained shows the importance of the invention and clearly differentiates said invention from all other heat controlling systems provided with a thermostat. In case the weather temperature is low or a door or window is left open in the room containing the thermostat, the air temperature near the latter may remain below the normal for which the thermostat is set, even though the boiler pressure has attained its safe working limit. Under these conditions each and every thermostat-controlled heat regulating system will hold open the draft damper and leave the cooling damper closed despite the excessive and rapidly-increasing steam pressure generated within the boiler. As a result, the steam pressure soon reaches the value for which the safety valve is set to blow, and the rapidly generated steam escapes through said valve into the atmosphere in such quantities as not only to fill the space where the boiler is with steam, but also what is more serious, to lower the water level in the boiler so that the latter will be exposed to the danger of being ruined by overheating. In the system illustrated in Fig. 4, however, when, under the above condition, the boiler pressure reaches that certain predetermined pressure sufficient to overcome the force exerted upon the diaphragm by the adjustable weight 15, the operation of the diaphragm closes the draft damper 16' and opens the cooling damper 16, irrespective of the position of the thermostat control. Obviously, the certain predetermined pressure above referred to shall be slightly below the pressure at which the safety valve blows, so that the boiler pressure will always be below the safety valve blowing pressure.

Fig. 5 shows a modified form of the connection between the crank 19 and the mechanism 20 and the end of the lever 13. In place of a pulley 22 loosely riding on a chain 18 a lever 30 is provided and the chain 23' connects the draft damper 16' to the lever 30 intermediate the ends 31 and 32 of the lever 30. A chain 33 connects the crank 19 to the end 32 of the lever 30, and a chain 34 connects the end of the lever 13 to the opposite end 31 of the lever 30. As indicated in the dotted line, it can be seen that the operation is similar in Figs. 1, 2, 3 and 4 and Fig. 5, and both the pulley and the lever 30 constitute levers of the second class.

Fig. 6 shows a diagrammatic illustration of the operation of the cranks 19 and 25 by means of the thermostat 21. The cranks 19 and 25, as shown in the diagram, are formed on a shaft 35, which is provided with a pinion 36 rigidly secured to the shaft and engaged by a rack 37 provided with plungers 38 and 39 respectively. The plungers 38 and 39 are operated by solenoids 40 and 41, the solenoids being operated intermittently by means of the battery 42 controlled by the thermostat 21. As shown in the diagram, the solenoid 40 is operated when the thermostat 21 contacts with the binding post 43, and solenoid 41 when the thermostat contacts with the binding post 44, as can be easily seen in the electric diagram in the figure.

While the accompanying drawings show a form of a thermostat mechanism provided with a crank shaft, the operation of the device may be performed by any form of thermostat, and the point of control of the diaphragm and the thermostat on the draft damper can be made in many different forms by any other system of leverage than the one shown in the drawing. It will be also remarked that, while my system is here described in connection with a steam boiler, the same may be used with a furnace in which the diaphragm is controlled by the heat developed in the furnace.

Having thus described my invention, I claim as new and desire to secure by Letters Patent:

1. In a heat controlling system, a combination of a boiler having a cooling damper and a draft damper; a diaphragm actuated by the pressure of the steam within said boiler; an operative connection between said diaphragm and said cooling damper; a thermostat having an operative connection to said cooling damper; a connection between said thermostat and said diaphragm; and an operative connection from said draft damper to said connection between said diaphragm and said thermostat.

2. In a heat controlling system, a combination of a boiler having a cooling damper and a draft damper; a diaphragm actuated by the pressure of the steam within said boiler; an operative connection between said diaphragm and said cooling damper; a thermostat having an operative connection to said cooling damper; a flexible connection between said thermostat and said diaphragm; and an operative connection from said draft damper to said connection between said diaphragm and said thermostat.

3. In a heat controlling system, a combination of a boiler having a cooling damper and a draft damper; a diaphragm actuated by the pressure of the steam within said boiler; said diaphragm being connected to said cooling damper for opening the latter when the diaphragm is actuated in one direction; a thermostat connected to said cooling damper for opening the same independently of said diaphragm; and means controlled by said thermostat and said diaphragm connected with said draft damper for operating the same.

4. In a heat controlling system, a combination of a boiler having a cooling damper and a draft damper; a diaphragm actuated by the pressure of the steam within said boiler, said diaphragm being connected to said cooling damper for opening the latter when the diaphragm is actuated in one direction; a thermostat connected to said cooling damper for opening the same independently of said diaphragm; a flexible connection from said thermostat to said diaphragm; and another flexible connection from said flexible connection to said draft damper for operating the same.

5. In a heat controlling system, a combination of a boiler having a cooling damper and a draft damper; a diaphragm actuated by the pressure of the steam within said boiler, a lever associated with the diaphragm and controlled by the same; a flexible connection from one end of said lever to said cooling damper; a shaft having a pair of oppositely directed cranks; a thermostat for operating said shaft; a flexible connection from one of said cranks to said cooling damper; another flexible connection from an opposite crank to the end of said lever opposite the one connected to said cooling damper; and means connecting said draft damper with said flexible connection between said lever and said crank.

6. In a heat controlling system, a combination of a boiler having a cooling damper and a draft damper; a diaphragm actuated by the pressure of the steam within said boiler; an operative connection between said diaphragm and said cooling damper; a thermostat; an operative connection from said thermostat to said cooling damper and a lever of the second class formed by an operative connection from said thermostat to one end of said lever; an operative connection from the other end of said lever to said diaphragm; and an operative connection from said draft damper to said lever intermediate its ends.

7. In a heat controlling system, a combination of a boiler having a cooling damper and a draft damper; a diaphragm actuated by the pressure of the steam within said boiler; an operative connection between said diaphragm and said cooling damper; a thermostat having an operative connection to said cooling damper; and a lever of the second class associated with said thermostat, said diaphragm and said draft damper.

8. In a heat controlling system, a combination of a boiler having a cooling damper and a draft damper; a diaphragm actuated by the pressure of the steam within said boiler; an operative connection between said diaphragm and said cooling damper; a thermostat having an operative connection to said cooling damper; a flexible connection between said thermostat and said diaphragm; a pulley loosely mounted on said flexible connection; and an operative connection from said pulley to said draft damper for operating the same.

In testimony whereof I have signed my name to this specification in the presence of two subscribing witnesses.

EDWARD P. CULVER.

Witnesses:
JOHN ALEXANDER,
JANE A. MYERS.